United States Patent Office 3,543,571
Patented Dec. 1, 1970

3,543,571
COMPENSATION FOR PHASE DISTORTION IN SURFACE PROFILE MEASURING APPARATUS
David John Whitehouse, Melton Mowbray, Leicester, England, assignor to The Rank Organisation Limited, London, England, a British company
Filed Nov. 3, 1967, Ser. No. 680,395
Int. Cl. G01b 7/34
U.S. Cl. 73—105        9 Claims

ABSTRACT OF THE DISCLOSURE

In the measurement of workpiece surface roughness a signal derived from a workpiece-feeling sensor is subjected to two consecutive identical filtering operations, between which the signal is stored, e.g., on a magnetic cylinder. The signal is read out from storage in the reverse sequence to that in which it is recorded, so that phase distortions in the two filtering operations compensate for each other, the resulting filtered signal being displayed as a measure of a particular surface irregularity.

---

This invention relates to the assessment of the surface profile of a workpiece and is concerned with apparatus capable of providing a magnified representation of the surface profile together with an assessment of the surface profile.

Irregularities in the surface profile of a workpiece can in general be considered as falling broadly into three main groups respectively referred to as roughness, waviness and errors of form. In the case of a machined surface, these irregularities respectively stem from the material cutting or abrasive action of the machining process, from defects such as vibration, between the tool and the workpiece and from imperfect guiding of the tool from its intended path. The irregularities are generally distinguished by the differences in their dominant crest spacings and therefore in the frequency or wavelength band of a signal derived from any suitable means and representative of the surface profile as a whole. An electric signal representative of the surface profile is conveniently produced by a sensor having a stylus engaging and traversing the surface under test.

In assessing the surface finish of a machined workpiece surface, it has been found essential in many applications, individually to assess each of these groups of irregularities separately. Accordingly, to enable such an individual assessment to be made, any apparatus intended for this purpose must include means for separating from the signal representative of the surface profile as a whole, that component representative of the group under investigation, such as roughness.

It is now accepted practice in assessing the roughness of a workpiece surface, to generate an electric profile signal representative of the surface profile as a whole and to pass this signal through a standardised two stage C.R. filter effective to separate from the profile signal that frequency band representative of the roughness component.

Such a standard two stage C.R. filter is described in "The Equation of the Mean Line or Surface Texture formed by an Electric Wave Filter," by D. J. Whitehouse and R. E. Reason, published by Rank Taylor Hobson Limited, England, 1965, and comprises two individual C.R. filter stages coupled in cascade with the second stage arranged not to load the first stage.

One disadvantage of this type of standard filter is that the relationship between the phase delay of an input waveform when passed through the filter and frequency is not linear so that roughness signals of relatively higher frequency emerge at the filter output before those of a relatively lower frequency. The phase distortion of the output signal produced by such a filter produces a roughness value at any particular point on the workpiece surface which is not exactly correlated with the true roughness value at that point as represented by the sensor output signal and any assessment of the roughness will therefore include inherent errors brought about by such phase distortion. In the case of certain types of roughness, for example roughness of a square rather than sinusoidal profile, these inherent errors can be considerable and render the assessment most inaccurate.

According to the present invention, apparatus for assessing the profile of the surface of a workpiece, comprises a sensor arranged to be moveable relatively to the surface under test and producing a profile signal representative of the surface profile, storage means for recording a signal derived from the profile signal as a continuous function of this signal together with filter means effective to isolate from the profile signal, a component representative of a particular surface irregularity type such as roughness, the arrangement being such that the profile signal is routed through the filter means by way of the storage means partly as a reversal of the stored continuous function so that any phase distortion in the profile signal initially introduced by filtering is subsequently compensated for as a result of the reversal and thereby removed. The phase-distortion-free output from the filter means thus produces an irregularity signal, for example a roughness signal, at a point on the workpiece surface which is accurately correlated with the profile signal at that point and allows the surface profile to be accurately assessed.

Suitably, the profile signal is an electric signal and the filter means are electric circuit filter means.

Where the roughness of the workpiece surface is to be evaluated, the overall filter means comprise any two stage C.R. filter of the type described in the Whitehouse and Reason publication hereinbefore referred to. A suitable filter has a cut-off wavelength equivalent to the sampling length of the surface under test and a maximum slope of about 12 to 13 db per octave. In this case the storage means conveniently are interposed between the stages of the filter so that only the profile signal modified in the first stage is recorded. The recorded signal is subsequently played backwards through the second identical stage which is effective to equalise any phase distortion introduced in the first stage so that the final output signal from the two stage filter as a whole will thus be phase distortion free. To effect complete equalisation when both the stages of the C.R. filter are identical, the playback speed of the storage means must be equal to the recording speed. However, if the recording speed and the playback speed are not equal, consequential adjustments in the time constants of the first and second filter stages must be made in order to produce complete phase equalisation.

Alternatively, the whole two-stage filter may be arranged to isolate the roughness component. In this case, the profile signal is recorded after being passed through both stages and is returned through these stages as a reversal of the continuous function to complete the filtering process and completely isolate the roughness component from the profile signal with no resulting phase distortion.

According to a further aspect of the present invention, therefore, apparatus for assessing the profile of the surface of a workpiece comprises a sensor arranged to be moveable relatively to the surface under test and producing a profile signal representative of the surface profile, filter means arranged partially to isolate from the profile signal a component representative of a particular surface irregularity type such as roughness, storage means arranged to record the partially filtered signal as a continuous function of this signal and to pass the recorded signal as a reversal of the continuous function through the said or functionally similar filter means effective to complete the filtering process, whereby any phase distortion of the profile signal introduced during the initial partial filtering is compensated for during the completion of filtering and thereby removed.

Suitably, the storage means are incorporated in the traversing mechanism for the sensor and are in the form of a tape, disc or drum of magnetisable material on which a recording head records the output signal from the first stage of the filter during the first sensing traverse of the sensor. At the end of the first traverse, the recording head is traversed backward to its starting point at the same time being used as a playback head to produce a signal for the second stage filtering. During this reversed traverse the sensor is restored to its starting point to enable it subsequently to investigate a further surface under test.

The reversal of the sensor traverse and the corresponding changes in circuit connections may be made automatically by switch means engaged by the traversing mechanism at the ends of the traverse.

In the case where the surface under test and therefore the sensor stylus traverse are substantially circular, the storage means conveniently also are incorporated in the traversing mechanism for the sensor and may be in the form of a tape, disc or drum driven synchronously with the spindle rotating the sensor or the workpiece. In this case the recording head may traverse backwards after the initial sensing traverse for the second stage of filtering, but preferably will either stop at the end of a first revolution or continue to rotate in the forward direction. In either case it may be necessary to allow more than one revolution before recording or playback begins in order to give filter network time to acquire steady state conditions.

The invention will now be particularly described by way of example with reference to the accompanying drawing wherein.

Figure 1:
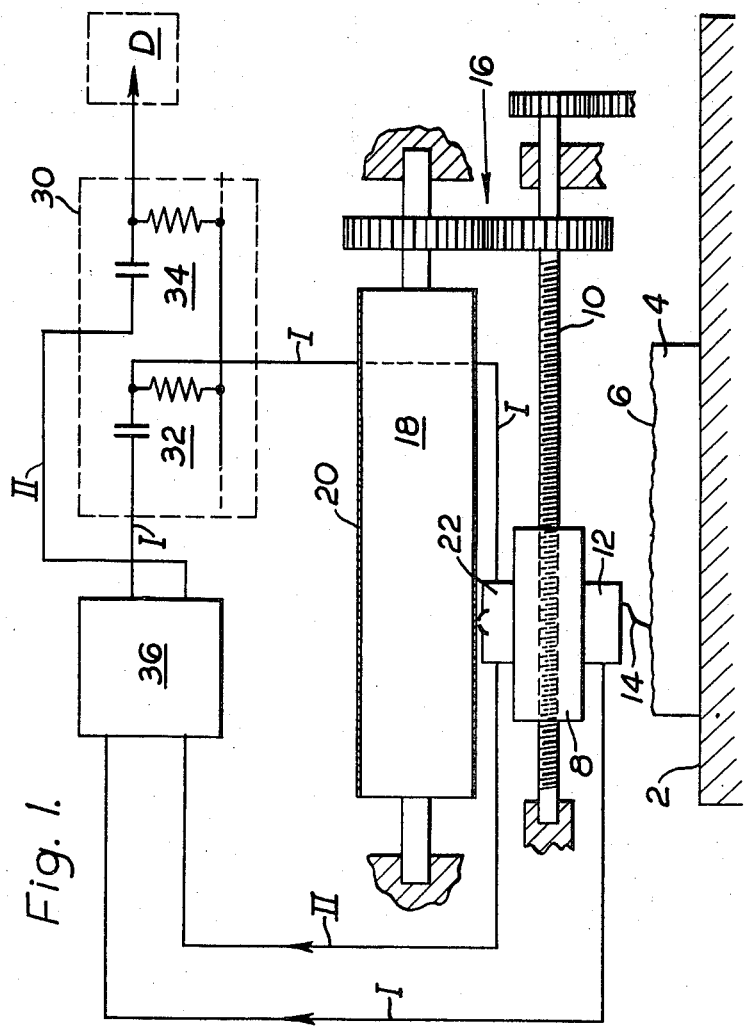
FIG. 1 is a schematic side view of an apparatus for producing a visual trace which is a magnified representation of the surface roughness of the workpiece under test.

It will be appreciated that the following describes only those features of the apparatus essential to the invention; those other features which are necessary to complete the structure and which are well known in the art are omitted for simplicity.

Referring now to the drawings, the apparatus includes a solid bed 2 on which the workpiece 4 is rigidly supported so that the surface 6 thereof under test is completely exposed for assessment.

Disposed adjacent the workpiece surface 6 is a moveable carriage 8 which is slidably supported on suitable guides (not shown) of any suitable form, so that the carriage freely can traverse at least the whole of that length of the surface 6 which is to be investigated. The support for the carriage conveniently includes means enabling the line of traverse to be adjusted so that it becomes substantially parallel to the nominal line of the surface 6.

Also engaging with the carriage 8 is a suitably driven lead screw 10 extending parallel to the support guides, so that with the lead screw driven to rotation the carriage will traverse the surface 6 by sliding relatively on the guides.

In order to assess the roughness of the surface 6, the carriage also supports a sensor comprising a transducer 12 including a stylus 14 which is arranged to make contact with the surface 6 so that with the stylus traversing the surface as a result of movement of the carriage 8, the transducer is effective to produce an electric output profile signal representative of the surface as a whole. This profile signal will include the component, namely the frequency band, representative of the roughness of the surface as well as those components or frequency bands representative of the waviness and errors of form as hereinbefore recited.

Coupled to the lead screw 10 by way of a gear train indicated generally at 16, is a drum 18 having its peripheral surface supporting a layer 20 of a suitable magnetic recording material. Also supported by the carriage 8 is, in this embodiment, a combined magnetic recording and playback head 22 which has its yoke resiliently biased against the magnetic layer 20. Accordingly as the carriage moves along the assessed length of workpiece surface 6 by rotation of the lead screw 10, the drum also will rotate and the recording head 22 will define on the layer 20, a circumferentially continuous helical track on which an electric signal applied to the head 22 can be recorded or from which a recorded signal can be translated to an electric signal. The track on the layer 20 will be fixed in relation to the position of the carriage 8 and the stylus 14 on the transducer 12, so that with the workpiece 4 fixed on the bed 2, each position on the workpiece surface 6 will have and will retain a corresponding position on the track of the layer 20.

In use of the apparatus and in order to assess the roughness of the surface 6, the position of the carriage 8 is set with the stylus engaging one end of the surface 6 and with the recording head 22 lying adjacent one end of the track on the magnetic layer 20. The lead screw is rotated at a predetermined rate giving the required frequency response in all parts of the apparatus, causing the stylus 14 to traverse the surface 6. The output from the transducer 12 during this first traverse is passed through the first stage 32 of a two-stage C.R. filter indicated 30 and by way of route I. This filter 30 a whole is effective to isolate from the profile signal delivered from the transducer 10, that frequency band representative of the roughness of the surface 6 and may take the form disclosed in the Reason et al. publication hereinbefore referred to.

During this first traverse of the surface 6, the profile signal from the transducer 12 now only partly modified in the first stage 32, is passed to the recording head 22 so that the partly filtered signal is continuously recorded on the track of the magnetic layer 20 over the whole of the whole of the traverse of the carriage 8. The signal recorded is thus a continuous function of the partly filtered signal.

At the conclusion of this initial traverse the direction of rotation of the lead screw 10 and of the direction of motion of the carriage 8 is reversed so that the head 22, now acting as a playback head, feeds the stored signal, now as a reversal of the continuously stored function through the second stage 34 of the filter 30 by way of route II.

Switching means 36 of any well known kind, whether automatic or not, are included to effect reversal of the carriage traverse and simultaneously to ensure that the signals applied to and derived from the head 22 are correctly routed through the two stages 32 and 34 of the filter 30, in order to effect the above sequence of operations.

The output of filter stage 32 which is effective to complete the filtering of the profile signal and thereby completely to isolate the roughness component from this signal, is applied to any convenient display means D which produce a visible and significed trace of the roughness.

In the embodiment described, if the rotation rate of the drum 18 is the same during the recording and playback by the head 22, the filter stages 32 and 34 also are identical. Under these conditions any phase distortion introduced in the filter stage 32 will be completely compensated for and equalised substantially to zero by passing the recorded signal from this stage through the functionally identical stage 34 and as a reversal of the continuously recorded function. However, it will be appreciated that if the recording and playback speed are not equal consequential adjustments in the time constants of the first and second filter stages must be made in order to produce complete phase equalisation.

In an alternative embodiment of the invention the second filter stage 34 may be completely dispensed with and the signal recorded on the track of the magnetic layer 20 may during the second traverse again be passed through the first stage 32 to effect complete phase equalisation.

In an alternative embodiment of the invention the phase distortion corrected signal could be applied to means suitable to assess said phase distortion corrected signal comprising the surface roughness component of the surface texture for example, said assessment means could be suitable to measure CLA or any other well known surface finish parameter like peak height or bearing length, etc.

In another embodiment said assessment means could be in addition to said display means.

In another embodiment said display means could be two speed so that the unfiltered signal and the phase distortion corrected signal could be displayed alternatively not necessarily at the same speed.

One more embodiment could be the storing of said signal as a sampled modulated signal on the storage medium. The modulation technique could be frequency modulation, pulse width modulation or any other modulation technique. In these cases sampling modulation and demodulation circuits such as are well known in electronics would have to be used.

The filter could, as an alternative to the filter mentioned previously, be of any transmission characteristic deemed to be useful in the isolation of the components of surface texture. The filter could, as another alternative, be an active filter of known type for example, including amplifying means having feedback to produce the required characteristics.

In a further embodiment of the invention, the stylus is secured to one end of an extension arm which is pivoted to the transducer support or housing and a second end of the arm is connected to actuate the transducer. This arrangement enables the stylus to be displaced from the transducer and enables any magnification ratio to be obtained by suitable choice of the pivot position.

Figure 2:
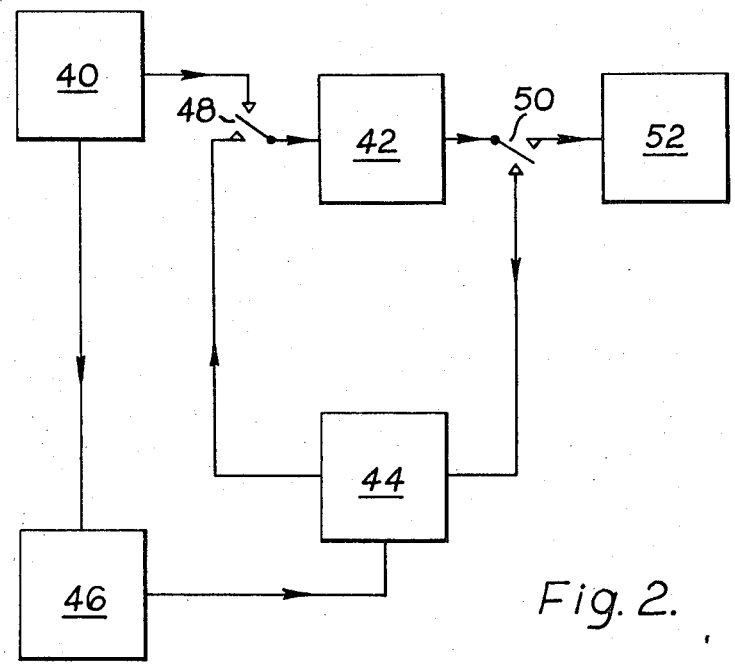
FIG. 2 is a block diagram of a second embodiment of the invention wherein a profile signal is obtained from conventional surface profile measuring equipment.

A further embodiment is shown in FIG. 2 in which the profile signal is obtained from a conventional surface profile measuring equipment 40, e.g., the Rank Taylor Hobson "Talysurf" (registered trademark). The profile signal is fed via a changeover switch 48, which is shown as a relay, but could take any suitable form, e.g., a transistor switch, to an electrical filter 42. This filter may have any suitable voltage/frequency characteristic e.g. that of a single C.R. network. The output of the filter 42 which is the profile signal modified in amplitude at some frequencies but with phase distortion, passes via a changeover device 50 similar to 48 to the input of a reversible storage system, e.g., a magnetic tape recorder, where it is recorded. When the stylus has completed its traverse, a signal from the profile measuring equipment 40 operates a reversing control mechanism 46, e.g., a relay. The reversing control mechanism 46 operates the changeover switches 48 and 50 and also starts the storage system 44 so that it reproduces the stored information, but in the reverse sequence to that in which it was recorded.

The output from the storage system 44 is fed via the changeover switch 50 to the display system 52 which may be a chart recorder, averaging meter, peak rectifier or any other suitable device. This signal is now the profile signal modified twice by the amplitude/frequency characteristic of the filter 42, but with the phase distortion corrected. It will be appreciated that separate filters having identical time constants could be used in place of the single filter 42 and the changeover switches 48 and 50.

Figure 3:
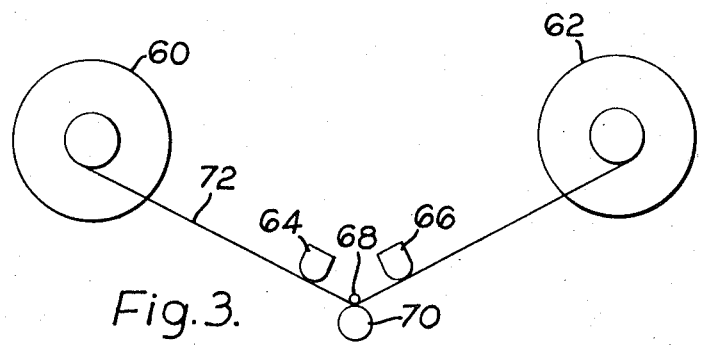
FIG. 3 illustrates a magnetic tape recorder suitable for use in the embodiment of FIG. 2.

The principles and construction of magnetic tape recording equipment are well known and a suitable arrangement for this application would be as shown in FIG. 3. The magnetic tape 72 passes between two storage spools 60 and 62, which have torque applied, either by stalled motors or slipping clutches, in opposing directions to keep the tape in tension. The tape 72 is made to run over the record/replay heads 64 and 66 at a constant linear speed by a capstan 68 driven at a stable speed and a pinch wheel 70 which presses the tape 72 against the capstan 68 so that there is no slip between the tape and capstan. In operation, the tape is made to press firstly from the spool 60 to the spool 62. The magnetic tape head 64 is now the recording head and this records the output signal from the filter 42 during the traverse of the stylus. When all the modified profile has been recorded, the tape must continue to run until all the recorded information has passed the record head 66.

When reversing control mechanism 46 operates, it causes the recording tape 72 to pass from spool 62 to spool 60. The magnetic tape head 66 is now the reply head and the signal from this is fed via the changeover switch 48 to the filter 42.

As the profile signal usually contains low frequency components, it is often convenient to record it on the tape by first modulating a sub-carrier either by frequency moduulation or pulse modulation. The output from the reply head 66 must then of course be demodulated to recover the signal before it is refiltered. When the information is recorded as a frequency-modulated subcarrier, it is common practice to record an unmodulated pilot track at the centre-frequency on an adjacent channel. The demodulated pilot signal is then subtracted from the demodulated signal channel output to compensate for wow and flutter, that is, spurious signals due to variations in tape speed which give apparent frequency modulation to the sub-carrier on replay.

If either sub-carrier or the pilot signal be switched on only during the traverse of the stylus, and the output of the replay head 66 monitored during the recording, the disappearance of the output may be used to reverse the recorder and start the replay sequence.

I claim:

1. An apparatus for assessing the profile of the surface of a workpiece, comprising a sensor means, means supporting a workpiece to be tested, means effecting relative movement of the workpiece and the sensor means to cause the latter to provide a profile signal representative of the profile of the workpiece surface, filter means receiving the profile signal and effective to isolate therefrom a signal component representative of a particular surface irregularity, storage means connected to the output of the filter means and storing as a continuous function the signal derived from a first filtering operation in the filter means, control means effective to read-out the signal from the storage means in the reverse sequence to that in which it was recorded therein and to pass said reversed signal through the filter means to complete the filtering of the profile signal in a second filtering operation, and display means displaying the completely filtered signal, whereby any phase distortion introduced into the profile signal in the course of the first filtering operation is subsequently compensated for in the second filtering operation on the reversed signal.

2. An apparatus for assessing the profile of the surface of a workpiece, comprising a sensor means, means supporting a workpiece to be tested, means effecting relative movement of the workpiece and the sensor means to cause the latter to provide a profile signal representative of the profile of the workpiece surface, filter means having first and second identical sections, means passing the profile signal through the first filter section to isolate from said profile signal a partially filtered signal in a first filtering operation, storage means connected to the output of the first filter section and storing as a continuous function the signal derived from a first filtering operation, control means effective to read-out the signal from the storage means in the reverse sequence to that in which it was recorded therein and to pass said reversed signal through the second filter section to complete the filtering of the profile signal in a second filtering operation, and display means displaying the completely filtered signal, whereby any phase distortion introduced into the profile signal in the course of the first filtering operation is subsequently compensated for in the second filtering operation on the reversed signal.

3. An apparatus for assessing the profile of a workpiece surface, comprising means supporting a workpiece to be tested, a slider moveable along a linear path relative to the workpiece support, sensor means carried by the slider and adapted to contact the workpiece surface and to traverse said surface thereof upon movement of the slider to provide a profile signal representative of the profile of said surface, filter means receiving the profile signal and effective to isolate therefrom a signal component representative of a particular surface irregularity, storage means comprising a rotatable cylinder, the axis of which is parallel to said linear path, having a surface of magnetic storage material, a recording head means and a playback head means mounted on said slider and adapted upon movement of the latter to describe respective helical paths on said surface of magnetic storage material, control switch means selectively interconnecting the said head means with the filter means and having a first position in which the profile signal is routed through the filter means to the recording head means in a first filtering operation, the partly filtered profile signal being recorded on the cylinder, and having a second position in which the recorded signal on the cylinder is read out by the said playback head means and routed through the filter means in a second filtering operation, said switch means being operative upon completion of the first filtering operation to reverse the direction of movement of the slider and the direction of rotation of the cylinder so that the signal is read out from the storage means in the reverse sequence to the signal recorded therein, whereby any phase distortion introduced in the first and second filtering operations substantially cancel each other, and display means displaying the completely filtered signal, representative of said surface irregularity, resulting from the second filtering operation.

4. An apparatus as claimed in claim 3, wherein the filter means are high pass filter means effective to isolate the roughness component of the profile signal for assessment.

5. An apparatus as claimed in claim 4 wherein the filter has a cut-off wave length equivalent to the length of the surface to be sampled and a maximum slope of 12 to 13 db per octave.

6. An apparatus as claimed in claim 3 wherein a common record/playback head means is used.

7. An apparatus as claimed in claim 3, wherein the control switch means comprise automatic switching means for controlling the recording and the playback sequence of operations.

8. An apparatus as claimed in claim 3 wherein means are included to record the profile signal by using it to modulate a sub-carrier together with means to demodulate the playback signal before the second filtering operation.

9. An apparatus as claimed in claim 8, wherein the modulation is frequency modulation and an unmodulated pilot signal is simultaneously recorded at the centre frequency of the frequency modulated sub-carrier, the demodulated signal being subtracted from the pilot signal prior to re-filtering in order to compensate for variations in cylinder speed.

References Cited

UNITED STATES PATENTS

| | | | |
|---|---|---|---|
| 2,588,915 | 3/1952 | Erikson | 179—100.1 |
| 3,032,881 | 5/1962 | Fengler | 346—33 |
| 3,147,574 | 9/1964 | LaPointe et al. | 324—34 |
| 3,208,272 | 9/1965 | Hall et al. | 73—105 |
| 3,313,149 | 4/1967 | Spragg | 73—105 |

FOREIGN PATENTS

| | | |
|---|---|---|
| 899,233 | 6/1962 | Great Britain. |

BERNARD KONICK, Primary Examiner

R. S. TUPPER, Assistant Examiner